United States Patent [19]

Neumann et al.

[11] Patent Number: 5,257,453
[45] Date of Patent: Nov. 2, 1993

[54] PROCESS FOR MAKING EXHAUST VALVES

[75] Inventors: William Neumann, Lakewood; Roger R. Wills, Solon; Mohan Kurup, Richmond Hts.; Victor Levin, South Euclid, all of Ohio

[73] Assignee: TRW Inc., Lyndhurst, Ohio

[21] Appl. No.: 910,681

[22] Filed: Jul. 8, 1992

Related U.S. Application Data

[63] Continuation-in-part of Ser. No. 738,349, Jul. 31, 1991, abandoned.

[51] Int. Cl.$^5$ .............................................. B21D 53/00
[52] U.S. Cl. ................ 29/888.4; 29/888.451; 29/888.452
[58] Field of Search ........... 29/888.4, 888.45, 888.451, 29/888.452, 890.12; 148/237, 512, 421, 326; 420/56, 59, 65, 66

[56] References Cited

U.S. PATENT DOCUMENTS

| | | | |
|---|---|---|---|
| 1,100,779 | 6/1914 | Rich ................................... | 29/888.4 |
| 1,351,949 | 9/1920 | Fuchs .................................. | 29/888.4 |
| 2,170,267 | 8/1939 | Rich ................................... | 29/888.4 |
| 3,319,321 | 5/1967 | Danis .................................. | 29/888.4 X |
| 3,366,472 | 1/1968 | Tanczyn et al. . | |
| 3,401,036 | 9/1968 | Dulis et al. . | |
| 3,753,693 | 8/1973 | Espy . | |
| 3,770,426 | 11/1973 | Kloske et al. ................... | 420/56 X |
| 4,902,359 | 2/1990 | Takeuchi et al. ................ | 148/421 X |
| 4,929,419 | 5/1990 | Wegman et al. ................ | 148/326 X |
| 4,985,092 | 1/1991 | Kaede et al. ..................... | 148/326 |

Primary Examiner—Timothy V. Eley
Attorney, Agent, or Firm—Tarolli, Sundheim & Covell

[57] ABSTRACT

A method of making work-hardened poppet exhaust valves for internal combustion engines comprises the steps of: providing a solutioned work-hardenable austenitic stainless steel coil or bar stock in which chromium is present in the range of 13%–25% by weight, nickel is present in the range of 4%–16% by weight, manganese is present in the range of 0.25%–8% by weight, copper is present in the range of 0.5%–7% by weight, the interstitial elements carbon plus nitrogen are present in a total amount less than 0.45% by weight, and at least one refractory metal selected from the group consisting of molybdenum, niobium, vanadium, tungsten and tantalum is present in the range of 1%–5% by weight; extruding the coil stock to a poppet valve preform configuration at a speed in the range of 60 to 100 strokes per minute and at a temperature in the range of room temperature to 1,000° F.; and heading the preform at the same speed while maintaining the head of the preform at a temperature in the range of room temperature to 2,200°; the parameters of extrusion providing the work-hardened poppet valve with a stem hardness more than $R_c=25$.

16 Claims, 3 Drawing Sheets

PROCESS FOR MAKING EXHAUST VALVES

RELATED APPLICATION

This application is a continuation-in-part of application Ser. No. 738,349 filed Jul. 31, 1991 and entitled "Process for Making Exhaust Valves" which is now abandoned.

BACKGROUND OF THE INVENTION

1. Technical Field

The present invention relates to poppet exhaust valves for internal combustion engines, and more particularly to a cold or warm heading process and improved austenitic stainless steel alloys for making such valves.

2. Description of the Prior Art

The manufacture of poppet exhaust valves for internal combustion utility, automotive and truck engines conventionally is a multi-step process. A bar stock of predetermined diameter is provided. The bar stock is a stainless steel alloy. A blank of desired length is cut from the bar stock. The blank is then reduced in diameter, for instance by extrusion, for its length, except at one end. The head end of the blank, which has not been extruded is then coined to a larger cross-section. The blank is then heat treated and machined to the valve finished dimensions.

Most poppet exhaust valves for internal combustion utility, automotive and truck engines are hot forged. The shaping steps, including extrusion and coining, are normally performed in the temperature range of 2,000° F. to 2,200° F. Hot forging has been necessary because of the relatively large size of the blanks used for the engine valves, and the high temperature operating properties desirable in an exhaust valve. The large size of the blanks means that more metal has to be moved a greater distance in the forming steps. This requires the use of high forming temperatures. The requirement of good high temperature operating properties has heretofore required the use of compositions capable of forming only by hot-forging.

Most hot-forged valves are made of an austenitic chromium, manganese, nickel, stainless steel alloy having a high weight content of interstitial elements, e.g., carbon and nitrogen. The following Table 1 lists two alloys used to produce a large majority of the poppet exhaust valves for internal combustion engines.

TABLE 1

| Hot Forged Austenitic Exhaust Valve Materials | | |
|---|---|---|
| Element | 21-4N | 21-2N |
| Chromium | 20-22 | 19.25-21.5 |
| Nickel | 3.25-4.5 | 1.5-2.75 |
| Manganese | 8-10 | 7.00-9.50 |
| Carbon | 0.475-0.575 | .50-.60 |
| Nitrogen | 0.38-0.50 | .29-.40 |
| Silicon | 0.25 Max | 0.25 Max |
| Sulfur | 0.06 Max | 0.06 Max |
| Phosphorus | 0.05 Max | 0.05 Max |

The high interstitial content (C+N) of these alloys imparts high strength and deformation resistance to the valves throughout the valve utilization range of below room temperature to 1,600° F. This is excellent for performance characteristics of the valves in service, but restricts the manufacturing options available to the manufacturer of the valves.

For instance, attempts at economically producing valves at lower temperatures, for instance room temperature, from these materials have not been successful. Parts will not form properly and tool life is unacceptable Mechanical crank and screw presses utilizing hot work tooling are used to produce these parts. The production rate is about 14 to 20 pieces per minute. This is a low production rate.

Other disadvantages of the state-of-the-art are poor tool life, distorted parts, excessive stock, and the added cost associated with straightening the valves and grinding excess material from the valves.

Another manufacturing process used to produce some utility exhaust valves is by cold header forming. The cold forming process differs from conventional hot forming. In this process coil stock of a predetermined diameter is provided in the annealed and coated condition. A blank of desired length is cut from the coil stock. On end of the blank is stamped to form a cone-shaped reduction or taper. This step is called "nosing". The blank is then reduced in diameter, for instance by extrusion, for its length, at the tapered end. The head end of the blank, which is the end opposite the nose end, is then upset to form a preliminary head. The preliminary head has a cross section smaller than the cross section of the finished head of the valve. The preliminary head is then coined to a larger cross section. The valve is then machined to its finished dimensions.

The cold header forming process provides a number of advantages compared to the hot forging process. This process results in much higher production rates, for instance 60-100 pieces per minute, and straighter more net shape parts. Also the cold forming work hardens the valves. This provides the valves, particularly the valve stem, with improved wear resistance and strength.

Disadvantages of cold heading are that only a few materials can be successfully processed into valve form and furthermore the size of these valves is severely limited. The following Table II gives the composition of one stainless steel alloy heretofore used for the manufacture of exhaust valves by cold heading.

TABLE 2

| Cold Headable Austenitic Exhaust Valve Material | |
|---|---|
| Element | 302HQ |
| Chromium | 17-19 |
| Nickel | 8-10 |
| Copper | 3-4 |
| Manganese | 2 Max. |
| Silicon | 1 Max. |
| Carbon | 0.08 Max. |
| Sulfur | 0.03 |
| Phosphorus | 0.045 |

The alloy of Table II is characterized by the presence of low amounts of the interstitial elements carbon and nitrogen. Carbon is specified at a low maximum value and nitrogen is limited to its natural absorption from surface air contact. As a result the 302HQ alloy is readily cold formed. However, even with the highly formable alloy 302HQ, the extrusion and coining strains are severely limited. In terms of true strain, extrusion is limited to a strain of about one. Above this value, tool life deteriorates precipitously The limit for true strain, in coining the alloy of Table II, is about 1.8. Above this level part quality deteriorates. For instance, head splitting can result.

Therefore, this alloy is suitable only for low duty applications, such as small utility engines having poppet valves of relatively small size. This alloy also lacks the thermal stability and elevated temperature properties required for most internal combustion engine poppet exhaust valves.

SUMMARY OF THE INVENTION

The present invention resides in an improved process for making poppet exhaust valves for internal combustion engines, comprising the steps of: providing an annealed austenitic stainless steel coil or bar stock in which chromium is present in the range of 13%-25% by weight, nickel is present in the range of 4%-16% by weight, manganese is present in the range of 0.25%-8% by weight, copper is present in the range of 0.5%-7% by weight, the interstitial elements are present in a total amount less than 0.45% by weight, and at least one refractory metal selected from the group consisting of molybdenum, vanadium, niobium, tungsten and tantalum is present in the range of 1%-5% by weight; extruding said coil or bar stock to a poppet valve preform configuration at a temperature in the range of room temperature to 1,000° F.; and heading said preform while maintaining the head of said preform at a temperature in the range of room temperature to 2,200°; the parameters of extrusion providing said poppet valve with a stem hardness more than $R_c=25$.

In one embodiment, the austenitic stainless steel alloy of the present invention comprises on a weight basis 13%-21% chromium, 8%-14% nickel, 0.5%-8% manganese, 2%-5.5% copper, 0.08%-0.45% carbon plus nitrogen, 1%-3% molybdenum, 0.25%-2.5% niobium, up to 1.5% each of vanadium, tungsten and tantalum, the combined total of vanadium, molybdenum, niobium, tungsten and tantalum being 1%-5% by weight, and up to 2.5% aluminum. In another embodiment, the austenitic stainless steel alloy of the present invention comprises

| Ingredient | Weight % |
|---|---|
| chromium | 14–18% |
| nickel | 9–14% |
| manganese | 1–3% |
| copper | 2–4% |
| molybdenum | 3–5% |
| carbon | 0.05–0.2% |
| nitrogen | 0.04–0.2% |
| iron | balance |

The total interstitial content is in the range of 0.09%-0.4%.

Preferably, the coil or bar stock is extruded at a true strain of about 0.8 or higher, and then is headed at a true strain of about 1.4–2.

A preferred coil or bar stock is one that is solution treated and water quenched.

In an embodiment of the present invention, the valves, following coining and machining, are nitrided.

BRIEF DESCRIPTION OF THE DRAWINGS

The foregoing and other features of the present invention will become apparent to one skilled in the art upon consideration of the following description of the invention with reference to the accompanying drawings, in which.

DESCRIPTION OF PREFERRED EMBODIMENTS

In the following specification, all percentages are expressed in terms of percentages by weight, and temperatures are in degrees Fahrenheit, unless other wise specified. In those compositions which are given in the specification, where the amounts add up to less than 100, it is understood that the balance is essentially iron.

In the following specification, the following data is disclosed:

Hardness: This value is obtained using the Rockwell (Rc) method of hardness testing.

True Stress: The true stress is equal to the load in thousands of pounds (k) divided by the instantaneous area in square inches (si) at the time of the stress measurement.

True Strain: The true strain is the log of the initial area divided by the instantaneous area.

A plot of the true strain against the true stress provides an accurate measure of the amount of load required to compression or tension form a part.

Creep Rupture: The performance of exhaust valve alloys is related to their creep rupture, namely, the time dependent deformation at constant stress and elevated temperature. This property is measured using the creep rupture test. A specimen, having a diameter of 0.125 inch, a nominal length of 1.12 inches and a gauge length of 0.5 inch is heated in air to a test temperature. A predetermined load is then applied and the percent elongation is measured at that load as a function of time.

Thermal Recovery: This test establishes the hardness retention capability of the material after exposure to high temperature for an extended time period. The test can be conducted in two ways. In one way, a cylindrical specimen having a length of about 0.5 inch is heated in air to a test temperature. At different time intervals the specimen is removed from the furnace, air cooled and its hardness is measured at room temperature. The results are plotted as hardness versus time for a particular test temperature. This test was used with the following Examples 1-5.

In an alternative way, the test is conducted using a gradient furnace, in which a cylindrical specimen is heated in air so that it has a variable temperature, along its length, varying incrementally from a temperature of 1,450° F. at one end to 1,150° F. at the opposite end. The specimen is heated for 500 hours, and then is cooled to room temperature. The specimen is then measured for hardness at different temperature gradient points along the length of the specimen.

This test was used in the following Example 6.

The method of the present invention comprises a first step of providing a coil or bar stock of predetermined diameter and composition. The coil or bar stock is in a predominantly austenitic phase, and is preferably solution treated and water quenched. The specific diameter of the coil or bar stock is selected following known procedures, and is dependent upon such considerations as the composition of the coil or bar stock and the final diameters of the valve stem and the valve head desired. The selection of a predetermined diameter coil or bar stock is not a part of the present invention.

The composition of the present invention comprises broadly 13%-25% by weight chromium, 4%-16% by weight nickel, 0.25%-8% by weight manganese, and 0.5%-7% copper. The interstitial elements, carbon and nitrogen, are present in a combined total amount less than about 0.45% by weight. Sulfur is also an interstitial element. Sulfur is present in no more than a trace amount, so that the reference herein to interstitial elements is in reference to only carbon and nitrogen. The composition of the present invention also contains 1%-5% by weight of a refractory metal selected from the group consisting of molybdenum, vanadium, niobium, tungsten and tantalum.

The chromium, nickel and manganese are critical elements to obtain an austenitic stainless steel structure. At least 13% chromium is required for hardness and for oxidation and corrosion resistance. At more than 25% chromium, the finished valves are difficult to form and have insufficient resistance to high temperature creep.

At least 4% nickel is required, also for oxidation and corrosion resistance. Preferably, the composition of the present invention comprises at least 8% nickel. However, with higher manganese, and interstitial elements, amounts of nickel less than 8% can be used. Nickel is an expensive ingredient, and 16% is a practical upper limit for nickel in a poppet valve. Preferably, the amount of nickel in the composition of the present invention is less than about 14%.

At least 0.25% manganese is conventionally present. At more than 8% manganese, the finished valves loose resistance to high temperature oxidation. A preferred lower limit is 0.5% manganese.

Copper is an important ingredient in the composition of the present invention for workability, and also for phase (austenite) stabilization. At least 0.5% copper is desirable. At more than 7% copper, such adverse effects as copper precipitation, high temperature oxidation, and pit corrosion can result. Also, copper is a heavy material and too much copper undesirably adds to the weight of the finished valves.

The interstitial elements are carbon, nitrogen and sulfur. No more than a trace amount of sulfur should be present. A small amount of carbon is desirable for high temperature strength and deformation resistance. At least 0.04% should be present. At more than 0.3%, the forming characteristics are adversely affected. A preferred upper limit is 0.3% carbon. More preferably, the upper limit for carbon is 0.2%.

Some nitrogen is also desirable for high temperature strength and deformation resistance. At least about 0.04% should be present. A preferred upper limit is 0.4%.

Preferably, at least 0.09% of the interstitial elements carbon and nitrogen is present in the composition of the present invention. It was found that at least 0.09% of the interstitial elements provided better high temperature properties. Specifically, as will be shown below in Example 6, parts made having at least 0.09% interstitial elements have improved resistance to creep at high temperature, and improved hardness retention at higher temperature. Although not to be bound by any theory, it is believed that the presence of carbon and nitrogen, in a combined amount of about 0.09% or more, pins the phase structure which is established by cold working and subsequent aging. This retards the recrystallization process during service at high temperature allowing favorable precipitation reactions to take place before recrystallization.

It is important that the coil or bar stock has been solution treated and water quenched. Solution treatment is a well-known procedure by which carbon becomes entrapped in the crystal lattice rather than being expelled from solution. It was found that if the coil or bar stock is solution treated, the carbon and nitrogen content can be increased from by way of example, low levels up to 0.4%, with little effect on the workability of the composition.

The composition of the present invention comprises 1%-5% of one or more refractory elements selected from the group consisting of molybdenum, vanadium, niobium, tungsten and tantalum. At least 1% of one or more refractory elements is necessary for high temperature hardness retention. More than 5% of the refractory elements adversely affects phase stability. The composition of the present invention, in one embodiment, comprises 0-3% molybdenum, and in another embodiment 3-5% molybdenum. The composition may also contain 0-2.5% niobium, and 0-1.5% each of vanadium, tungsten and tantalum. In the above one embodiment, the composition preferably comprises 1-3% molybdenum, 0.25-2.5% niobium, and up to 1.5% each of vanadium, tungsten and tantalum. In the said another embodiment, it was found that with the use of 3-5% molybdenum, no further advantage was achieved with proportions of any of the other listed refractory elements in combination with molybdenum.

The composition of the present invention can also comprise additional elements, such as up to 1% maximum silicon.

In said one embodiment, the austenitic stainless steel alloy of the present invention comprises, preferably, on a weight basis, 13-21% chromium, 8-14% nickel, 0.5-8% manganese, 2-5.5% copper, 0.08-0.45% carbon plus nitrogen, 1-3% molybdenum, 0.25-2.5% niobium, up to 1.5% each of vanadium, tungsten and tantalum, the total of vanadium, molybdenum, niobium, tungsten and tantalum being 1-5% by weight, and up to 2.5% aluminum.

In said another embodiment, the composition of the present invention comprises 14-18% chromium, 9-14% nickel, 1-3% manganese, 2-4% copper, 3-5% molybdenum, 0.05-0.2% carbon, 0.04-0.2% nitrogen, the balance being iron. In this embodiment, the total content of interstitial elements (carbon and nitrogen) is in the range of 0.09% to 0.4%.

Following the step of providing a coil or bar stock of predetermined diameter and composition, the coil or bar stock is cut to a blank form. The length of the blank is dependent upon the size valve required. The blank is then stamped at one end to form a cone-shaped nose or taper. These are known steps in the manufacture of valves by cold heading and require no discussion.

The valve blank is then reduced in diameter, for instance by extrusion. The extrusion proceeds from the nose end towards the opposite end of the blank or head end. The blank is extruded or otherwise reduced in diameter only up to the head end.

In the present invention, the reduction in diameter is performed at a temperature in the range of room temperature to 1,000° F. Preferably, the reduction is performed at a temperature in the range of about 225° F. to 500° F. The amount of reduction is dependent upon the finished diameter desired. Broadly, the amount of the reduction, the specific composition of the coil stock, the temperature at which the extrusion is carried out, and the work hardness of the stem are all interdependent parameters which are selected following known procedures. Generally, a lower temperature is used for the production of smaller engine valves, for instance utility engine valves, and a higher extrusion temperature is used for the production of the larger automotive or other heavy duty engine valves.

A critical aspect of the present invention is to carry out the extrusion at a temperature, and an amount of size reduction, to obtain the benefits of cold or warm working, that is to obtain work hardness. Preferably, the temperature of working, and amount of size reduction are selected to obtain a stem hardness of at least about $R_c=25$.

A measure of the amount of size reduction by extrusion is the true strain to which the part is subjected. Preferably, the extrusion is carried out at a true strain of about 0.8 or higher, at a temperature in the range of about 225° to 500° F.

Following size reduction, the blank is headed to increase the diameter of the head. This can be carried out in a two-step process in which the blank head is upset to a preliminary head configuration and then is coined to a larger diameter. The coining step can be carried out at room temperature, or at an elevated temperature up to about 2,200° F. A lower coining temperature is used to make the smaller utility engine valves. Higher coining temperatures are used for larger automotive and other heavy duty engine valves. The upset and coining steps can be performed at the same temperature as the extrusion or size reduction step. Alternatively, the upset and coining steps can be performed at a higher temperature than that used for extrusion or size reduction. This is accomplished by heating only the head, for instance by induction heating, at a temperature up to 2,200° F., prior to subjecting the part to further upsetting and coining.

The upset and coining steps are carried out in conventional upset and coining apparatus. Preferably, the upset and coining steps are carried out at a temperature of at least about 200° F. Preferably, the coining, whether the only head forming step, or part of the sequence of steps, is carried out at a true strain of 1.4 to 2.0, e.g., about 1.8.

The following Examples illustrate the present invention.

EXAMPLE 1

The purpose of this Example is to show that the compositions of the present invention are readily cold worked, and that the compositions work harden during either cold or warm forming.

A plurality of slugs having the following compositions of Table 3, identified hereinafter as $R_6$ and $A_3$, were provided. Slugs having the composition 302HQ of the above Table 2 were also provided. The specific 302HQ composition used is also provided in Table 3.

TABLE 3

| Ingredient | $R_6$ Weight % | $A_3$ Weight % | 302HQ Weight % |
|---|---|---|---|
| Chromium | 13 | 15.3 | 17.4 |
| Nickel | 10.5 | 13.0 | 9.53 |
| Manganese | 1 | 1.33 | 1.48 |
| Molybdenum | 2.1 | 3.97 | — |
| Nitrogen | 0.09 | 0.045 | — |
| Carbon | 0.04 | 0.065 | 0.02 |
| Copper | 2.7 | 3.58 | 3.73 |
| Silicon | 0.26 | — | 0.20 |
| Niobium | 0.7 | — | — |

The diameter of the slugs was 0.3 inch. The slugs were compressed up to a true strain of about 1.0. The forming was carried out by compressing a slug (0.3 inch diameter by 0.6 inch long) in a tensile machine at a nominal strain rate of about 0.1 inch/minute.

The forming was performed at four temperatures for $R_6$, room temperature, about 400° F., about 600° F., and about 1,000° F., and at three temperatures for $A_3$, room temperature, 400° F. and 600° F. The samples of 302HQ were formed at room temperature. The samples were formed at different true stresses and true strains. The true stresses were plotted against true strains.

Figure 1:
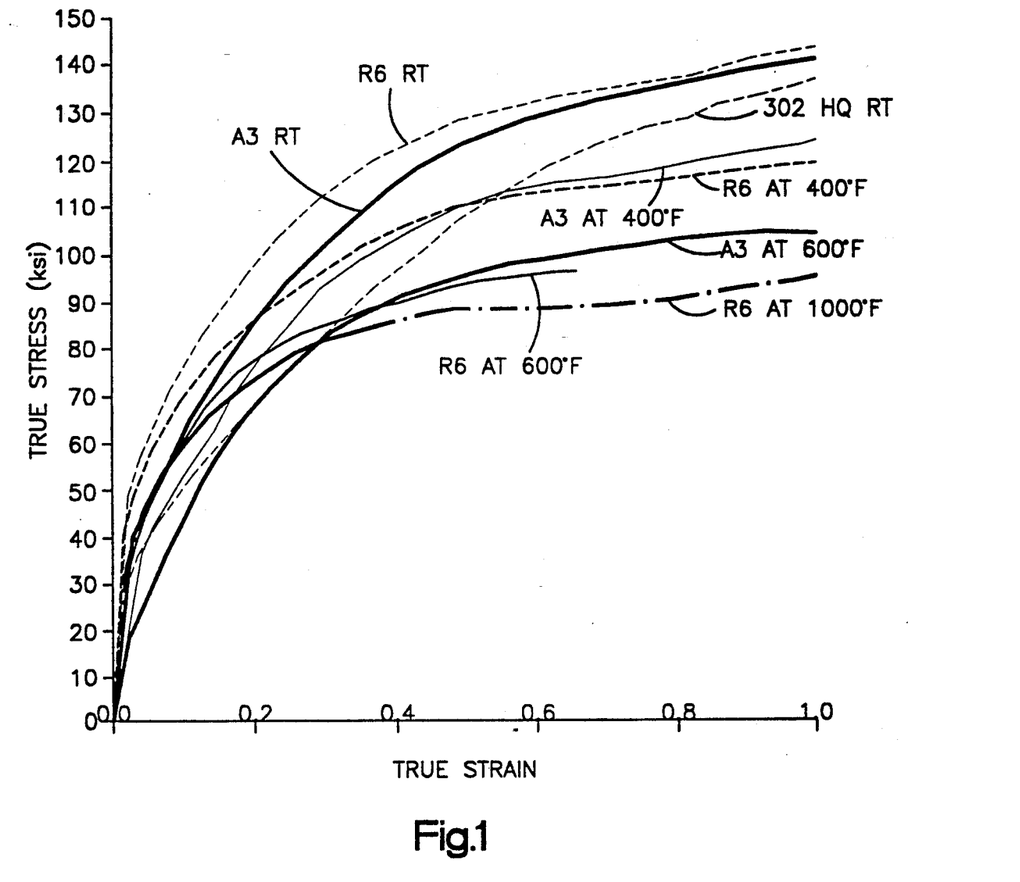
FIG. 1 is a graph plotting true stress against true strain comparing parts made having compositions in accordance with the present invention against parts made having the composition 302HQ of Table II.

FIG. 1 is a graph of the data obtained.

In FIG. 1, the numbers by each curve indicate the material and temperature in °F. at which the compression was carried out. "RT" indicates that the forming was carried out at room temperature.

The graph in FIG. 1 shows that the composition of the present invention performed comparably to 302HQ stainless steel in compression, and that strains greater than 1 were readily obtained at reasonable stress values of less than about 150 KSI. It will be recalled that a 302HQ steel is a conventional cold headable steel. This means that a 302HQ steel can conventionally be formed at room temperature without such adverse effect as head splitting and poor tool wear. Referring to FIG. 1, the 302HQ steel required a true stress, at room temperature, of about 135 KSI to reach a true strain of about 1.

By comparison, the composition $R_6$ of the present invention, achieved at room temperature, a true strain of about 1, at a true stress of about 143 KSI. $A_3$ achieved a true strain of 1.0 at a true stress of about 141 KSI.

To reduce the forming stresses of the alloys of this invention, to stress values below those of 302HQ at room temperature, higher temperature forming was investigated.

When the temperature of forming was increased to 400° F., the composition $R_6$ of the present invention required a true stress of only 120 KSI to achieve a true strain of 1.0. The composition $A_3$ required a true stress of only 124 KSI to achieve a true strain of 1.0. Both of these are below the stress required to form 302HQ at room temperature.

The compositions $R_6$ and $A_3$ of the present invention were also readily formable at 600° and 1,000° F., as shown in FIG. 1.

The following Table 4 gives examples of hardness measurements Rc which were obtained on $R_6$ and $A_3$ specimens formed to the true strains given in the Table.

TABLE 4

| Temp. of Upset °F. | $R_6$ | | $A_3$ | |
| --- | --- | --- | --- | --- |
| | Strain | Rc Hardness | Strain | Rc Hardness |
| Room Temp. | 1.9 | 29 | 1 | 31.5 |
| 400° F. | 1.4 | 25.5 | 1.5 | 36 |
| 600° F. | .7 | 24.5 | 1 | 25 |
| 1,000° F. | 1.7 | 26 | — | — |

These hardness values, even those obtained at upset temperatures above room temperature, are as good as those obtainable by room temperature forming of 302HQ.

In tests conducted with valve materials formable by hot-forging, for instance the material 21-2N of Table I, high true stress values of about 300 KSI were required for a true strain reduction of about 1 at 600° F. For production, and reasonable tool life, this material would have to be heated to about 2,000° F. to achieve a true strain of more than 1. At room temperature, the maximum strain that can be achieved on a 21-2N material is about 0.6.

EXAMPLE 2

In this Example, parts having the compositions $R_6$ and $A_3$ of Example 1 were provided. The parts had a starting diameter of 0.437 inches. The parts were extruded to a stem diameter of 0.255 inches, providing a true strain of 1.077. The extrusion was carried out at 400° F. The extrusions were then machined to a final diameter of 0.244 inch. The machined extrusions had a hardness of 28 Rc, for $R_6$, and a hardness of 33 Rc for $A_3$. This Example shows that parts made in accordance with the present invention, which are extruded and then machined, have good hardness.

EXAMPLE 3

The head ends of extruded parts having the compositions $R_6$ and $A_3$, made according to the procedure of Example 2 were upset to a head diameter of about 0.850 inch, and then coined to a head diameter of about 1.0 inch. The heading and coining steps were carried out at the same temperature as extrusion, about 350° to 450° F. The valve pieces were then machined to final dimensions in both the head and stem portions following the forming steps. Similar valve pieces having the composition 302HQ of Example 1 were also made.

Specimens from the valve pieces were then subjected to the above-mentioned test for thermal recovery. The specimens were obtained from the valve stems. The specimens each had a length of about 0.5 inch. The specimens were heated in a furnace at 1,300° F., in an air atmosphere, for varying periods of time. The specimens were then removed from the furnace, air cooled for hardness (Rc) measurement.

Figure 2:
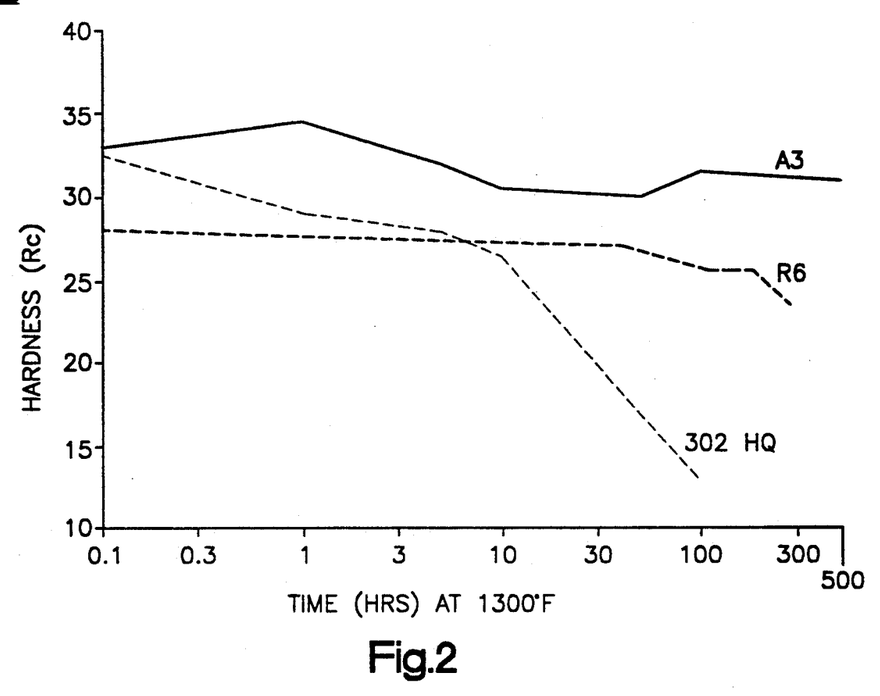
FIG. 2 is a graph comparing the thermal stability at 1,300° F. of parts made in accordance with the present invention against parts made having the composition 302HQ of Table II.

FIG. 2 contains comparative data for the 302HQ, $R_6$ and $A_3$ compositions. As shown in FIG. 2, the thermal recovery or hardness retention of valve pieces made according to the present invention was substantially better than the thermal recovery or hardness retention of valve pieces made using the 302HQ steel. The hardness retention of the 302HQ steel dropped to less than 15 Rc at 100 hours. By comparison, the composition $A_3$ retained a hardness above $R_c=30$ for up to 500 hours at 1,300° F. The composition $R_6$ retained good hardness for up to about 300 hours at 1,300° F.

EXAMPLE 4

Figure 3:
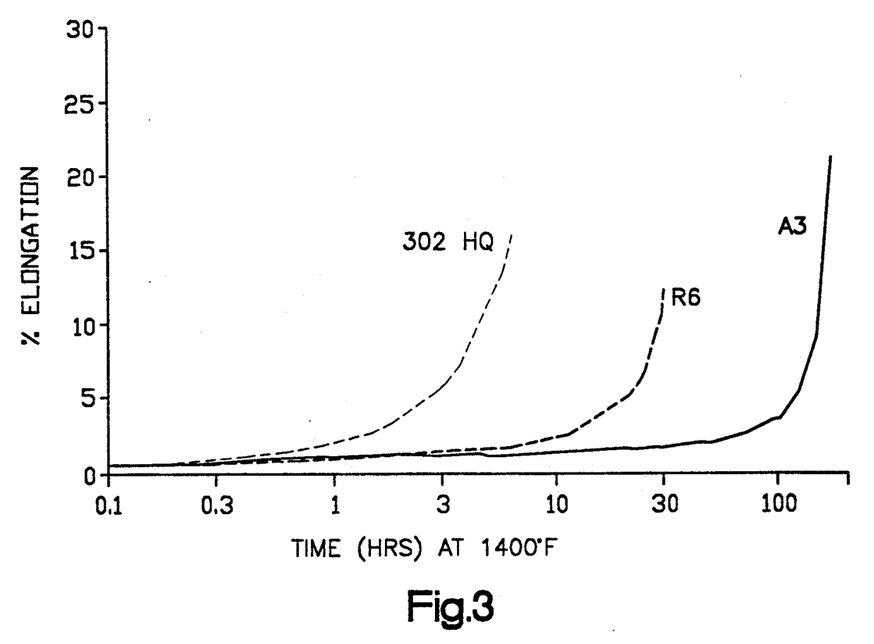
FIG. 3 is a graph comparing the creep resistance at 1,400° F. of parts made in accordance with the present invention against parts having the composition 302HQ of Table II.

Valve pieces of the present invention having the compositions $R_6$ and $A_3$, were prepared according to the procedure of Example 2. The valve pieces were tested for creep rupture at 1,400° F. and 15,000 psi, until failure. This is the standard accelerated test for testing valve parts, described above. The results are shown in FIG. 3. Comparative data was also obtained for 302HQ valve pieces, also plotted in FIG. 3. The composition of this material is given in Example 1. It will be recalled that the 302HQ steel is a conventional cold-headable material. The specimens were obtained from the valve stems. The specimens had a nominal length of 1.12 inches and were machined to a diameter of 0.125 inch. The specimens were subjected to a constant tension load of 15,000 psi, at 1,400° F., for varying periods of time up to rupture. FIG. 3 shows that the valve pieces of the present invention experienced much less elongation and had a much better resistance to creep rupture than 302HQ valve pieces subjected to the same test. The 302HQ valve pieces experienced about 15% elongation in less than ten hours. The valve pieces $R_6$ experienced little percent elongation up to about twenty hours. The valve pieces $A_3$ experienced even less elongation up to about one hundred hours.

EXAMPLE 5

Machined valves of this invention are nitrided to develop a wear resistant surface. The cold worked surface facilitates the formation of a deep hard compound layer having a thickness of about 0.001 inch in a salt bath nitriding process at 1,060° F. for 60 minutes. In comparison, the conventional alloys of Table 1 have a nitrided layer of only 0.0004 inch thickness after nitriding under identical conditions.

EXAMPLE 6

This Example illustrates the importance of having, in the composition of the present invention, an interstitial element content (carbon plus nitrogen) in the range of 0.09-0.4 weight percent, in combination with 3-5% molybdenum. Preferably, the composition of the present invention comprises 0.05-0.2 weight percent carbon and 0.04-0.2 weight percent nitrogen. The present composition also, preferably, comprises the following additional ingredients:

| Ingredient | Weight % |
| --- | --- |
| chromium | 14-18% |
| nickel | 9-14% |
| manganese | 1-3% |
| copper | 2-4% |
| iron | balance |

Coil stocks having the following compositions of Table 5 were cut into slugs having a diameter of 0.437 inch. The slugs, except for the 21-2N composition, were solution quenched, by heating the slugs at 2,150° F. for one hour, and then quenching the slugs with water. The 21-2N slugs were hot extruded at 2,200° F. and then were aged at ten hours at 1,400° F.

TABLE 5

|    | Alloy Compositions wt. % | | | | | |
| --- | --- | --- | --- | --- | --- | --- |
|    | 302HQ | 316 | A3A | A3M | B2 | 21-2N |
| Cr | 17.3 | 16.81 | 15.63 | 15.49 | 16.11 | 21.4 |
| Ni | 9.57 | 12.85 | 10.65 | 13.32 | 9.08 | 2.5 |
| Mn | 1.24 | 1.87 | 1.66 | 1.00 | 2.55 | 8.2 |
| Mo | 0.23 | 2.02 | 3.84 | 4.08 | 3.04 | — |
| Cu | 3.13 | 0.4 | 3.73 | 3.39 | 3.28 | — |
| C | 0.03 | 0.07 | 0.10 | 0.08 | 0.10 | 0.55 |
| N | 0.06 | 0.077 | 0.13 | 0.045 | 0.18 | 0.03 |
| TI* | 0.09 | 0.147 | 0.23 | 0.125 | 0.28 | 0.85 |

*Total Interstitial

The slugs had a length of 2.035 inches. The slugs were extruded to a true strain of about 1, using a ⅝ inch header (National Machinery Corporation, Tiffin, Ohio). This forming was performed at 400° F.

Following extrusion, the preforms from the slugs A3A, A3M and B2, of the present invention, were headed, also at 400° F., and at a true strain of 1.6 providing a poppet valve configuration. In the heading step, no cracking of the heads was observed.

Figure 4:
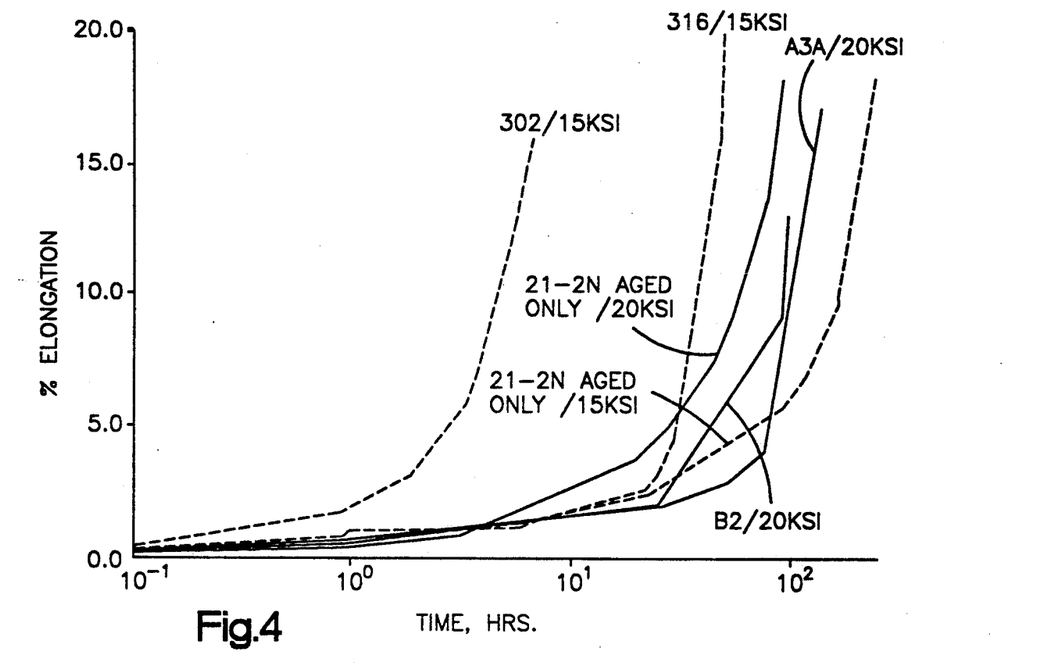
FIG. 4 is a graph comparing the creep resistance at 1,400° F. of parts made in accordance with a preferred embodiment of the present invention, against control compositions, and shows the importance to this property of having in the alloy a carbon and nitrogen content of at least 0.09% and a molybdenum content of 3%-5%.

The preform extrusions were tested for creep resistance and hardness retention. The creep resistance was determined using the creep rupture test described above. The specimens were machined to a diameter of 0.125 inch and cut to a nominal length of 1.12 inches. The gauge length was 0.5 inch. The specimens were heated to 1,400° F. Loads of 15 ksi were applied to certain samples and 20 ksi to other samples. The results of the creep test are shown in FIG. 4.

The hardness retention was determined using the Thermal Recovery test in a gradient furnace, described above. Cylindrical specimens having a length of about three inches were heated in air so that the temperature varied along the length of the specimens within the range from 1,450° F. at one end to 1,150° F. at the opposite end. The actual temperature gradient was 80° F. per inch. The specimens were heated for 500 hours, using the above temperature gradient, and after this time interval, were removed from the furnace, cooled, and measured for hardness at different gradient temperature points. The results are plotted in FIG. 5 as hardness ($R_c$) against temperature (°F.).

In the above Table 5, the samples made in accordance with the present invention are labelled samples A3A, A3M, and B2. Table 5 also gives compositions for three other samples, 302HQ, 316, and 21-2N. It will be recalled that the 21-2N steel is conventionally used as an exhaust valve material, and is described above. The 21-2N steel has a high interstitial content (carbon plus nitrogen) of about 0.85. This high interstitial content imparts high strength and deformation resistance to the steel. This is well known. The problem with a 21-2N steel, for use in poppet valves, is, as indicated above, that the materials cannot be satisfactorily cold-worked or worked at low temperatures.

The steel 302HQ is readily cold formed. However, as indicated above, it lacks thermal stability and elevated temperature properties, making it unsuitable for most internal combustion poppet exhaust valve applications.

The 316 steel is a commercially available austenitic stainless steel. It is listed in the metals Handbook, 8th Edition, American Society for Metals, on page 409. It is believed that this material has never heretofore been used for the manufacture of internal combustion engine poppet exhaust valves or proposed for such use.

Referring to the above Table 5, the interstitial contents of the samples 302HQ and 21-2N fall outside of the preferred ranges, of the present invention. The carbon content of the 302HQ steel is at 0.03%, below the preferred lower limit of 0.05%, of the present invention. The carbon content of the 21-2N steel, at 0.55%, is above the preferred upper limit of the present invention, of 0.2%.

None of the samples 302HQ, 316, or 21-2N, have a molybdenum content within the range of 3–5%.

FIG. 4 shows how the respective samples compare with respect to creep resistance. In FIG. 4, as mentioned above, certain tests were conducted with certain samples at 15 ksi (the dashed lines) and certain tests with other samples at 20 ksi (the solid lines). The higher stress was used with those samples having the highest strength, at a temperature of 1,400° F.

As expected, the sample 302HQ (in a dashed line) showed a high percent elongation, when exposed to only 15 ksi, and ruptured in a relatively short period of time.

Also, as expected, the sample 21-2N, at 15 ksi (also in a dashed line) showed significantly less percent elongation, maintaining a low percent elongation, even past $10^2$ hours. The sample 316 (a dashed line) also showed a significantly low percent elongation at 15 ksi, significantly better than the 302HQ steel, but not as good as that for the 21-2N steel.

Data was also obtained at 20 ksi for the steel 21-2N (the solid line for this steel). At this higher stress, at 1,400° F., the percent elongation is much greater. Even so, this sample performed well, as expected, showing little elongation for a period well over $10^1$ hours.

The unexpected results were those achieved at 20 ksi with the samples A3A and B2 of the present invention (shown in solid lines). Despite the presence of significantly lower carbon and nitrogen contents, compared to the 21-2N steel, these samples performed even better than the 21-2N steel, maintaining a low percent elongation even longer than the 21-2N steel at the higher stress of 20 ksi.

Figure 5:
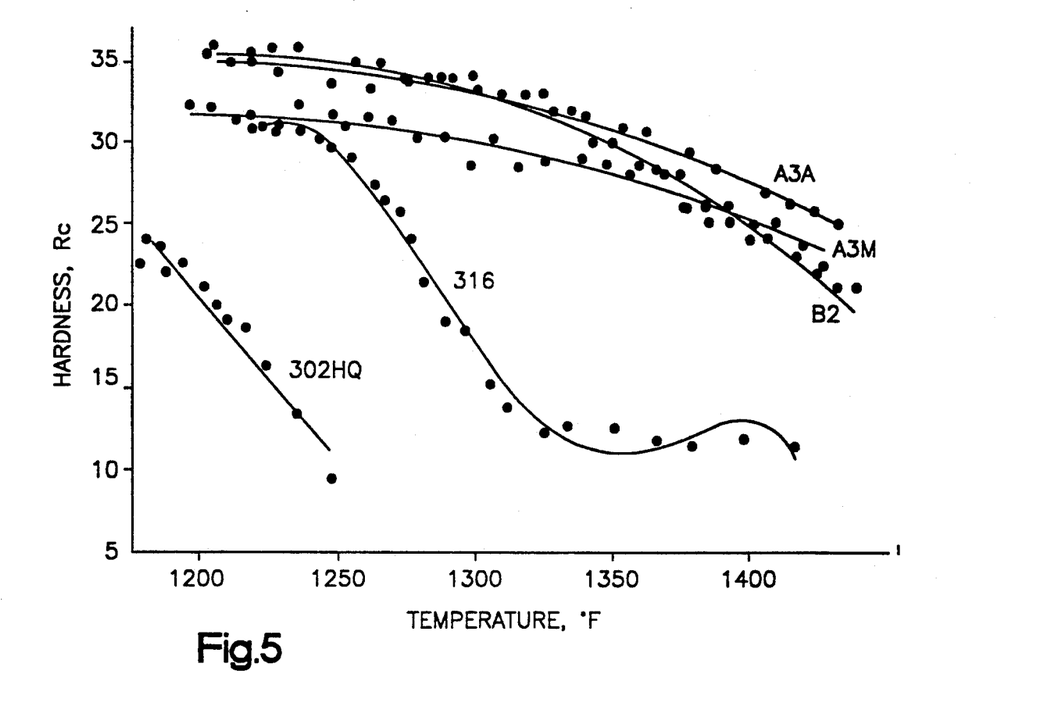
FIG. 5 is a graph comparing the hardness retention versus temperature of parts made in accordance with a preferred embodiment of the present invention, against control compositions, and shows the importance to this property of having in the alloy a carbon and nitrogen content of at least about 0.09% and a molybdenum content of 3%-5%.

The curves of FIG. 5 confirm the improved high temperature results achieved by the compositions of th present invention. Referring to FIG. 5, the samples A3A, A3M, and B2 showed consistently better hardness retention, when exposed to temperatures in the range of 1,200° F.–1,400° F., than the sample 302HQ. For example, the cold-worked 302HQ material, exposed to 1,300° F., for 500 hours, had a hardness ($R_c$) of 5. The samples of the present invention retained, for this exposure, a cold-worked hardness of $R_c$ 31 or more. The samples of the present invention also showed significantly better hardness retention than the sample 316.

Among other advantages, this allows use of the compositions of the present invention at service temperatures presently reserved for the 21-2N steels, in turn increasing the types of engines in which the valves of the present invention can be used.

Hardenable stainless steels undergo a recovery or recrystallization process when exposed, in service, to temperatures above 1,200° F. This precipitation can be intragranular or intergranular. Intergranular precipitation is precipitation of the intermetallic phases at the grain boundaries, and is often a cause of embrittlement in stainless steels.

The presence of the interstitial elements, carbon and nitrogen, as indicated above, slows down the recovery or recrystallization process. With a total interstitial content of more than 0.09%, with at least 0.04% carbon and 0.05% nitrogen, the delay is long enough for the precipitation of the intermetallic phases to start within the cold-worked structure.

With the use of 3-5% molybdenum, one constituent of the intermetallic phase is $Fe_2Mo$. This compound, $Fe_2Mo$, provides improved creep resistance and hardness retention to parts made from the compositions of the present invention. In addition, it was found that with sufficient precipitation of $Fe_2Mo$ intragranularly, within the grain boundaries, the rate of precipitation relative to the rate of recovery or recrystallization was further increased. This allowed more precipitate to form on the slip lines, dislocations, and twins, rather than at the grain boundaries of the recrystallized austenitic grains. With an effective amount of $Fe_2Mo$, the intragranular precipitation pins the existing dislocation structure, delaying the recrystallization process until the time when coarsening of the precipitates occurs.

By so altering the distribution of precipitates, this reduces the problem of embrittlement that is often associated with intermetallic phases in stainless steels.

No other element or combination of elements was found to have this beneficial effect of delaying the recovery or recrystallization process and promoting intragranular precipitation of the intermetallic phases.

By keeping the interstitial content (carbon and nitrogen) at a level less than 0.4%, cold formability is still possible when the alloy of the present invention is solution treated prior to the cold or warm forming.

From the above description of the invention, those skilled in the art will perceive improvements, changes and modifications. Such improvements, changes and modifications within the skill of the art are intended to be covered by the appended claims.

Having described the invention, the following is claimed:

1. A method for making work-hardened poppet exhaust valves for internal combustion engines comprising the steps of:
   (a) providing an annealed work-hardenable stainless steel coil or bar stock comprising 13%-25% by weight chromium, 4%-16% by weight nickel, 0.25%-8% by weight manganese, 0.5%-7% by weight copper, at least 0.04 weight % each of carbon and nitrogen with the carbon content being less than 0.2 weight % and the total interstitial content being less than 0.45 weight %, and 1%-5% by weight of a refractory metal selected from the group consisting of molybdenum, niobium, vanadium, tungsten and tantalum;
   (b) extruding said coil or bar stock to a poppet valve preform configuration at a temperature in the range of room temperature to 1,000° F. and at a true strain of more than 0.8 to work harden said coil or bar stock;
   (c) heading said preform to a final pre-machined configuration while maintaining the head of such preform at a temperature in the range of room temperature to 2,200° F., said heading being carried out at a true strain of 1.4-2; and
   (d) said work-hardened poppet valve having a stem hardness more than $R_c=25$.

2. The method of claim 1 wherein said extrusion and heading are carried out at a production rate of 60 to 100 pieces per minute and a temperature in excess of 225° F.

3. The method of claim 2 wherein said extrusion and heading are carried out at the same temperature in the range of 225° F. to 500° F.

4. The method of claim 3 wherein said coil or bar stock comprises on a weight basis 13%-21% chromium, 8%-14% nickel, 0.5%-8% manganese, 2%-5.5% copper, 0.08%-0.45% carbon plus nitrogen, 1%-3% molybdenum, 0.25%-2.5% niobium, up to 1.5% vanadium, up to 1.5% tantalum, up to 1.5% tungsten, and up to 2.5% aluminum, the combined total of vanadium, molybdenum, niobium, tungsten and tantalum being in the range of 1-5%, the remainder being essentially iron.

5. The method of claim 4 wherein said coil or bar stock has a total interstitial content, carbon plus nitrogen, of 0.09% or more.

6. The method of claim 5 wherein said coil or bar stock is solution treated and water quenched before extrusion.

7. The method of claim 1 wherein said coil or bar stock has a total interstitial content, carbon plus nitrogen, of 0.09% or more.

8. The method of claim 7 wherein said coil or bar stock is solution treated and water quenched before extrusion.

9. The method of claim 1 including the steps of machining the preform and nitriding the preform following machining.

10. The method of claim 1 wherein said annealed stainless steel coil or bar stock comprises on a weight basis 13-21% chromium, 8-14% nickel, 0.5-8% manganese, 2-5.5% copper, 0.08-0.45% carbon plus nitrogen, 1-3% molybdenum and 0.25-2.5% niobium.

11. A method for making work-hardened poppet exhaust valves for internal combustion engines comprising the steps of:
   (a) providing an annealed work-hardenable stainless steel coil or bar stock comprising 14-18% by weight chromium, 9-14% by weight nickel, 1-3% by weight manganese, 2-4% by weight copper, 0.09-0.4% by weight interstitial elements, wherein carbon comprises 0.05-0.2% by weight of the composition and nitrogen 0.04-0.2% by weight of the composition, and 3-5% by weight molybdenum;
   (b) solution treating said stainless steel coil or bar stock and water quenching the same;
   (c) extruding said coil or bar stock to a poppet valve preform configuration at a temperature in the range of room temperature to 1,000° F. under conditions effective to work harden said coil or bar stock;
   (d) heading said preform to a final pre-machined configuration while maintaining the head of said preform at a temperature in the range of room temperature to 2,200° F.;
   (e) said work-hardened poppet valve having a stem hardness more than $R_c=31$.

12. The method of claim 11 wherein said extrusion is carried out at a true stain of more than 0.8 and said heading is carried out at a true strain of 1.4-2.

13. The method of claim 12 wherein said extrusion and heading are carried out at a production rate of 60 to 100 pieces per minute and a temperature in excess of 225° F.

14. The method of claim 13 wherein said extrusion and heading are carried out at the same temperature in the range of 225° to about 500° F.

15. A method for making work-hardened poppet exhaust valves for internal combustion engines comprising the steps of:
   (a) providing an annealed work-hardenable stainless steel coil or bar stock comprising 13%-25% by weight chromium, 4%–16% by weight nickel, 0.25%–8% by weight manganese, 0.5%–7% by weight copper, at least 0.04 weight % each of carbon and nitrogen with the carbon content being less than 0.2 weight % and the total interstitial content being less than 0.45 weight %, and 1%–5% by weight of a refractory metal selected from the group consisting of molybdenum, niobium, vanadium, tungsten and tantalum;

(b) extruding said coil or bar stock to a poppet valve preform configuration at a temperature in the range of room temperature of 1,000° F., at a true stress less than 150 ksi, and at a true strain of more than 0.8 to work harden said coil or bar stock;

(c) heading said preform to a final pre-machined configuration while maintaining the head of such preform at a temperature in the range of room temperature to 2,200° F., said heading being carried out at a true strain of 1.4–2; and (d) said work hardened poppet valve having a stem hardness more than $R_c = 25$.

16. A method for making work-hardened poppet exhaust valve for internal combustion engines comprising the steps of:

(a) providing an annealed work-hardenable strainless steel coil or bar stock comprising 14–18% by weight chromium, 9–14% by weight nickel, 1–3% by weight manganese, 2–4% by weight copper, 0.09–0.4% by weight interstitial elements, wherein carbon comprises 0.05–0.2% by weight of the composition and nitrogen 0.04–0.2% by weight of the composition, and 3–5% by weight molybdenum;

(b) solution treating said stainless steel coil or bar stock and water quenching the same;

(c) extruding said coil or bar stock to a poppet valve preform configuration at a temperature in the range of room temperature to 1,000°, at a true stain of more than 0.8 to work harden said coil or bar stock, and at a true stress less than 150 ksi;

(d) heading said preform to a final pre-machined configuration while maintaining the head of said preform at a temperature in the range of room temperature to 2,200° F.;

(e) said work-hardener poppet valve having a stem hardness more than $R_c = 31$.

* * * * *

UNITED STATES PATENT AND TRADEMARK OFFICE
CERTIFICATE OF CORRECTION

PATENT NO. : 5,257,453

DATED : November 2, 1993

INVENTOR(S) : William Neumann, Roger R. Wills, Mohan Kurup and Victor Levin

It is certified that error appears in the above-identified patent and that said Letters Patent is hereby corrected as shown below:

Column 14, line 55, change "stain" to --strain--.

Column 16, line 16, change "stain" to --strain--.

Signed and Sealed this

Third Day of May, 1994

Attest:

BRUCE LEHMAN

*Attesting Officer*  *Commissioner of Patents and Trademarks*